United States Patent [19]
Aoki et al.

[11] Patent Number: 5,482,545
[45] Date of Patent: Jan. 9, 1996

[54] INK, AND INK-JET RECORDING METHOD AND INSTRUMENT USING THE SAME

[75] Inventors: Makoto Aoki, Yokohama; Yoshifumi Hattori, Yamato; Mayumi Yamamoto, Tokyo; Shinichi Tochihara, Hadano; Yoshihisa Takizawa, Machida; Akira Nagashima, Tokyo; Shinichi Sato, Kawasaki, all of Japan

[73] Assignee: Canon Kabushiki Kaisha, Tokyo, Japan

[21] Appl. No.: 362,983

[22] Filed: Dec. 23, 1994

[30] Foreign Application Priority Data

Dec. 28, 1993 [JP] Japan .................. 5-348975

[51] Int. Cl.$^6$ .................. C09D 11/02
[52] U.S. Cl. .................. 106/22 K; 106/22 H
[58] Field of Search .................. 106/22 K, 22 H

[56] References Cited

U.S. PATENT DOCUMENTS

| | | | |
|---|---|---|---|
| 4,197,135 | 4/1980 | Bailey et al. | 106/23 |
| 4,224,212 | 9/1980 | Topham | 106/20 R |
| 4,267,088 | 5/1981 | Kempf | 106/22 H |
| 4,299,630 | 11/1981 | Hwang | 106/22 H |
| 4,659,382 | 4/1987 | Kang | 106/22 |
| 4,789,400 | 12/1988 | Solodar et al. | 106/22 H |
| 5,017,224 | 5/1991 | Tomita et al. | 106/22 H |
| 5,017,644 | 5/1991 | Fuller et al. | 106/22 H |
| 5,082,496 | 1/1992 | Yamamoto et al. | 106/22 |
| 5,100,470 | 3/1992 | Hindagolla et al. | 106/22 |
| 5,123,960 | 6/1992 | Shirota et al. | 106/22 |
| 5,125,969 | 6/1992 | Nishiwaki et al. | 106/22 |
| 5,127,946 | 7/1992 | Eida et al. | 106/22 |
| 5,130,723 | 7/1992 | Yamamoto et al. | 346/1.1 |
| 5,135,571 | 8/1992 | Shirota et al. | 106/22 |
| 5,137,570 | 8/1992 | Nishiwaki et al. | 106/22 |
| 5,167,703 | 12/1992 | Eida et al. | 106/22 K |
| 5,178,671 | 1/1993 | Yamamoto et al. | 106/22 K |
| 5,213,613 | 5/1993 | Nagashima et al. | 106/20 R |
| 5,213,614 | 5/1993 | Eida et al. | 106/22 K |
| 5,215,577 | 6/1993 | Eida et al. | 106/22 K |
| 5,215,578 | 6/1993 | Eida et al. | 106/22 K |
| 5,233,028 | 6/1993 | Aulick et al. | 106/22 H |
| 5,256,194 | 10/1993 | Nishiwaki et al. | 106/22 K |
| 5,258,505 | 11/1993 | Eida et al. | 534/680 |

FOREIGN PATENT DOCUMENTS 1480068  5/1967  France .

*Primary Examiner*—Helene Klemanski
*Attorney, Agent, or Firm*—Fitzpatrick, Cella, Harper & Scinto

[57] ABSTRACT

Disclosed herein is an ink comprising a dye having at least one anionic group, an amino acid type polyamine or a polyethyleneimine containing at least 7 nitrogen atoms in its molecule, and water, wherein the dye is either a metallized azo dye or a nonmetallized azo dye satisfying the following conditions (x) and (y) at the same time:

(x) no anionic group is situated at an ortho position to the azo bond, and at least one anionic group exists at another position than the ortho position to the azo bond; and (y) at least one aromatic residue is bonded to the azo bond, and the aromatic ring of the aromatic residue is a benzene or naphthalene ring, with the proviso that the aromatic rings situated on both sides of the azo bond are not naphthalene rings at the same time if present.

16 Claims, 3 Drawing Sheets

INK, AND INK-JET RECORDING METHOD AND INSTRUMENT USING THE SAME

BACKGROUND OF THE INVENTION

1. Field of the Invention

The present invention relates to an ink, and particularly to an ink suitable for use in recording on so-called plain paper such as woodfree paper, an ink-jet recording method using such an ink, and ink-jet recording instruments to which the ink is applied.

2. Related Background Art

It has heretofore been discovered that since polyamines such as polyethyleneimine act as cationic polyelectrolytes in an aqueous solution containing a dye and hence have affinity (weak bonding) for azo dye molecules having an anionic group such as a sulfonic group, and also have strong affinity (van der Waals' forces and hydrogen bond to cellulose, etc.) for recording media, they can improve the water fastness of inks used in ink-jet printers.

For example, an ink disclosed in France Patent No. 1480068 contains a polyethyleneimine having a molecular weight of 500 to 100,000. This polyethyleneimine contains a primary amine on its molecule. Most of direct dyes and acid dyes used in inks for ink-jet printers contain at least one azo bond. Now, such an ink has involved a problem that this azo bond is reduced by the primary amine of the polyethyleneimine molecule in the aqueous solution during the storage of the ink, and so the dye is decomposed to make the ink useless. On the other hand, the ink according to the present invention, which will be described subsequently, is similar to such an ink, but can retain its initial performance for a long period of time because the dye used therein is different from that of the France patent, and is not decomposed even after its storage.

On the other hand, U.S. Pat. No. 4,197,135 discloses an ink composition having good water fastness, which comprises at least one water-soluble dye and a polyamine containing at least 7 nitrogen atoms in its molecule. According to this U.S. patent, both good water fastness and good ink storability can be achieved at the same time. However, the polyamine used is limited to polyamines containing no primary amine. Polyamines containing a secondary amine or a tertiary amine also have a sure effect on water fastness. However, their performance is somewhat poor compared with the polyamines containing a primary amine. Namely, the ink composition according to U.S. Pat. No. 4,197,135 has not been said to completely satisfy the water fastness.

Further, U.S. Pat. No. 4,659,382 discloses an ink composition comprising a major amount of water, a hydroxyethylated polyethyleneimine polymer and a dye compound and having good water fastness, said polymer containing about 65 to 80% of a hydroxyethyl group. In this case, the polymer is hydroxyethylated, so that its hydrophilicity becomes higher, and the storability of the ink is improved. However, the ink has involved a problem that the water fastness is somewhat deteriorated correspondingly.

Furthermore, U.S. Pat. No. 5,100,470 discloses an ink composition comprising a major amount of water, a water-soluble organic solvent, a polyalkylenepolyamine containing nitrogen atoms up to five and a dye. However, since the improvement of water fastness by the polyalkylenepolyamine directly correlates to the number of nitrogen atoms. The effect of the polyalkylenepolyamine on the water fastness is scarcely exhibited unless it contains at least 7 nitrogen atoms. Therefore, the polyamine according to this U.S. patent has some effect to improve water fastness on only limited dyes.

SUMMARY OF THE INVENTION

It is accordingly an object of the present invention to provide an ink suitable for use in ink-jet recording on plain paper and excellent in both water fastness and ink storability, and an ink-jet recording method and instruments using such an ink.

The above object can be achieved by the present invention described below.

According to the present invention, there is thus provided an ink comprising a dye having at least one anionic group, an amino acid type polyamine or a polyethyleneimine containing at least 7 nitrogen atoms in its molecule, and water, wherein the dye is either a metallized azo dye or a nonmetallized azo dye satisfying the following conditions (x) and (y) at the same time:

(x) no anionic group is situated at an ortho position to the azo bond, and at least one anionic group exists at another position than the ortho position to the azo bond; and (y) at least one aromatic residue is bonded to the azo bond, and the aromatic ring of the aromatic residue is a benzene or naphthalene ring, with the proviso that the aromatic rings situated on both sides of the azo bond are not naphthalene rings at the same time if present.

According to the present invention, there is also provided an ink-jet recording method comprising applying an ink to a recording medium by an ink-jet system to conduct recording, wherein the ink described above is used as said ink.

According to the present invention, there is further provided a recording unit comprising an ink container portion and a head from which the ink is ejected in the form of ink droplets, wherein the ink described above is used as said ink.

According to the present invention, there is still further provided an ink cartridge comprising an ink container portion, wherein the ink described above is used as said ink.

According to the present invention, there is yet still further provided an ink-jet recording apparatus comprising the recording unit described above.

According to the present invention, there is yet still further provided an ink-jet recording apparatus comprising the ink cartridge described above.

DESCRIPTION OF THE PREFERRED EMBODIMENTS

Figure 1:
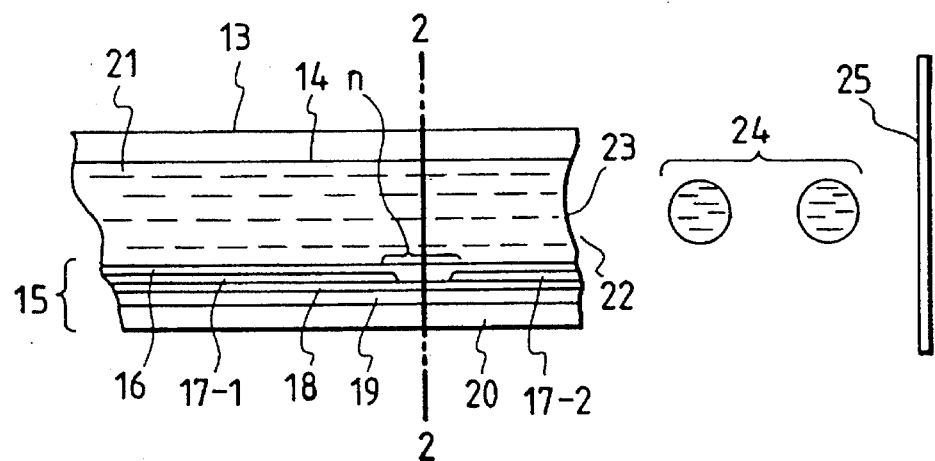
FIG. 1 is a longitudinal cross-sectional view of a head of an ink-jet recording apparatus.

Polyamines such as polyethyleneimine act as cationic polyelectrolytes in an aqueous solution containing a dye and hence have affinity (weak bonding) for azo dye molecules having an anionic group such as a sulfonic group, and also have strong affinity (van der Waals' forces and hydrogen bond to cellulose, etc.) for recording media. Therefore, they have an effect to improve the water fastness of inks.

However, it has been found that when such a polyamine and an anionic group in an azo dye are stored in a state weakly bonded to each other in an aqueous solution for a long period of time, and the anionic group is situated at an ortho position to the azo bond (for example, Reactive Yellow 2 and the like), the primary amine contained in the polyamine tends to attack the azo bond to reduce and decompose it because the polyamine is close to the azo bond in structure, whereby the dye undergoes decomposition. On the other hand, it has also been found that when the anionic group is situated at a meta or para position to the azo bond, i.e., a position structurally distant from the azo bond (for example, Acid Yellow 25 and the like), the dye does not undergo reductive decomposition. Accordingly, an ink using an azo dye having such a structure can combine good water fastness with good ink storability.

In general, there are benzene rings on both sides of the azo group of an azo dye, and a conjugated system is formed therefrom. However, in a dye having a structure that the length of a conjugated system corresponding to one azo bond is equivalent to at least four benzene rings, said structure being obtained by substituting the benzene rings on both sides with napthalene rings, the spread of a $\pi$ electron cloud which is high in mobility and low in excitation energy becomes great. In such a case, also, it has been found that the reductive decomposition of an azo dye by a polyamine tends to occur.

On the contrary, it has been found that in case benzene rings are situated on both sides of the azo bond of an azo dye, or a benzene ring and a naphthalene ring are separately situated on both sides of the azo bond, namely, in the case of an azo dye having a structure that the length of a conjugated system corresponding to one azo bond is equivalent to at most three benzene rings, the reductive decomposition of the dye does not occur.

Accordingly, an ink using an azo dye having such a structure can combine good water fastness with good ink storability.

Besides, it has been found that metallized azo dyes in which a metal is coordinated on an azo group undergo no reductive decomposition because the bond strength of the azo group is increased. Accordingly, an ink using an azo dye having such a structure can also combine good water fastness with good ink storability.

The present invention will hereinafter be described in detail by the preferred embodiments.

As the dye having at least one anionic group, which is a component of the ink according to the present invention, there is used a metallized azo dye or a nonmetallized azo dye satisfying the following conditions (x) and (y) at the same time:

(x) no anionic group is situated at an ortho position to the azo bond, and at least one anionic group exists at another position than the ortho position to the azo bond; and (y) at least one aromatic residue is bonded to the azo bond, and the aromatic ring of the aromatic residue is a benzene or naphthalene ring, with the proviso that the aromatic rings situated on both sides of the azo bond are not naphthalene rings at the same time if present.

As specific examples of the nonmetallized azo dye having the above structure, may be mentioned Direct Yellow 1, Direct Yellow 8, Direct Yellow 9, Direct Yellow 10, Direct Yellow 28, Direct Yellow 44, Direct Yellow 50, Acid Yellow 11, Acid Yellow 17, Acid Yellow 23, Acid Yellow 25, Acid Yellow 36, Acid Yellow 38, Acid Yellow 42, Acid Yellow 44, Acid Yellow 72, Acid Yellow 99, Acid Red 183, Acid Red 186 and Acid Red 296. With respect to the above-mentioned azo dyes, the structural formulae, the positions of the anionic groups and the number of aromatic rings (in terms of benzene rings) bonded to one azo bond are shown in Table 1.

Besides, examples of other azo dyes useful in the practice of the present invention include Direct Yellow 39; Direct Violet 47 and 48; Direct Blue 76, 80, 90, 98, 200, 201, 202 and 226; Direct Brown 95, 100 and 112; Direct Black 71; Acid Yellow 59, 98, 99, 111, 112, 116, 128 and 161, or Cosmolan Yellow RL (trade name, product of Sumitomo Chemical Co., Ltd., or Taoka Chemical Co. Ltd.); Acid Orange 74, 87, 88 and 122, or Cosmolan Orange RL (trade name, product of Sumitomo Chemical Co., Ltd., or Taoka Chemical Co. Ltd.); Acid Red 180, 183, 184, 186, 194, 198, 209, 211, 215, 216, 256 and 317, or Cosmolan Red 4GL (trade name, product of Sumitomo Chemical Co., Ltd., or Taoka Chemical Co. Ltd.); Acid Violet 75 and 78, or Cosmolan Bordeaux RL (trade name, product of Sumitomo Chemical Co., Ltd., or Taoka Chemical Co. Ltd.); Acid Blue 151, 154, 158, 161, 168, 170, 171, 184, 187, 192, 199, 229 and 234, or Cosmolan Blue FGL (trade name, product of Sumitomo Chemical Co., Ltd., or Taoka Chemical Co. Ltd.), or Cibalan Blue FBL (trade name, product of Ciba-Geigy AG); Acid Green 12, 35, 43, 56, 57, 60, 61, 65, 73, 75 and 76; Acid Brown 19, 28, 30, 31, 44, 45, 46, 224, 225, 226, 231, 232, 256, 257, 295, 296 and 297; Acid Black 51, 52, 58, 60, 62, 64, 107, 108, 112, 115, 118, 119, 121, 122, 131, 132, 139, 140, 155 and 156, or Cosmolan Gray RL 115% (trade name, product of Sumitomo Chemical Co., Ltd., or Taoka Chemical Co. Ltd.), or Cosmolan Black BL (trade name, product of Sumitomo Chemical Co., Ltd, or Taoka Chemical Co. Ltd.), or Kayakalan Black RBL (trade name, product of Nippon Kayaku Co., Ltd.), or Kayakalan Black SLW (trade name, product of Nippon Kayaku Co., Ltd.), or Kayakalan Gray BLR (trade name, product of Nippon Kayaku Co., Ltd.); Reactive Yellow 16; Reactive Red 6, 7, 23 and 32; Reactive Violet 1, 2, 4 and 5, or Sumifix Brilliant Violet B (trade name, product of Sumitomo Chemical Co., Ltd.), Reactive Blue 9, 20, 40 and 43, Reactive Brown 8, 9, 10 and 11; and Reactive Black 1, 8, 9 and 31. The structural formulae, the positions of the anionic groups and the number of aromatic rings (in terms of benzene rings) bonded to one azo bond as to some of them are also shown in Table 1.

The anionic groups contained in the molecules of the above-mentioned dyes are often sulfonic groups. However, these may be carboxyl groups and phosphoric groups, or substituted groups thereof.

Besides the above-mentioned dyes, any dye may be used so far as it has the above-described structure. In general, the concentration of these dyes is suitably selected within the range of from 0.1 to 10% by weight based on the total weight of the ink.

TABLE 1

Dyes preferably used in inks of the invention

| C.I. No. | Structural Formula | *1 | *2 |
|---|---|---|---|
| Direct Yellow 1 | NaOOC-C6H3(OH)-N=N-C6H4-C6H4-N=N-C6H3(OH)-COONa | Meta | 2 |
| Direct Yellow 8 | NaO3S-(H3C)C6H3-benzothiazole-C6H4-N=NC(CH3)(OH)-CONH-C6H5 | Distant | 1 |
| Direct Yellow 9 | NaO3S-(H3C)C6H3-benzothiazole-C6H4-N=NHN-C6H4-benzothiazole-(CH3)-SO3Na | Distant | 1 |
| Direct Yellow 10 | NaO3S-(H3C)C6H3-benzothiazole-C6H4-N=N-C6H3(OH)-COONa | Meta/distant | 2 |
| Direct Yellow 28 | NaO3S-(H3C)C6H3-benzothiazole-C6H4-N=N-C6H4-benzothiazole-(CH3)-SO3Na | Distant | 2 |
| Direct Yellow 44 | NaO3S-C6H4-N=N-C6H3(OCH3)-NHCOHN-C6H3(COONa)-OH | Meta | 2 |

TABLE 1-continued

Dyes preferably used in inks of the invention

| C.I. No. | Structural Formula | *1 | *2 |
|---|---|---|---|
| Direct Yellow 50 | (structure) | Meta/distant | 3 |
| Acid Yellow 11 | (structure) | Distant | 1 |
| Acid Yellow 17 | (structure) | Para/distant | 1 |
| Acid Yellow 23 | (structure) | Para/distant | 1 |
| Acid Yellow 25 | (structure) | Meta/distant | 1 |

TABLE 1-continued

Dyes preferably used in inks of the invention

| C.I. No. | Structural Formula | *1 | *2 |
|---|---|---|---|
| Acid Yellow 36 | | Meta | 2 |
| Acid Yellow 38 | | Meta | 2 |
| Acid Yellow 42 | | Meta | 1 |
| Acid Yellow 44 | | Meta | 1 |
| Acid Yellow 72 | | Distant | 1 |
| Acid Yellow 99 | | Meta | 1 |

TABLE 1-continued

Dyes preferably used in inks of the invention

| C.I. No. | Structural Formula | *1 | *2 |
|---|---|---|---|
| Acid Red 183 | | Meta/distant | 1 |
| Acid Red 186 | | Para/distant | 2 |
| Acid Red 296 | | Meta | 3 |
| Direct Blue 98 | | Ortho/distant | 3 |

TABLE 1-continued

Dyes preferably used in inks of the invention

| C.I. No. | Structural Formula | *1 | *2 |
|---|---|---|---|
| Direct Yellow 39 | | Distant | 1 |
| Direct Violet 48 | | Orhto | 3 |
| Dirct Brown 112 | | Orhto | 3 |
| Acid Orange 74 | | Meta | 1 |

TABLE 1-continued

Dyes preferably used in inks of the invention

| C.I. No. | Structural Formula | *1 | *2 |
|---|---|---|---|
| Acid Blue 158 | (structure) | Para/distant | 4 |
| Acid Green 12 | (structure) | Distant | 3 |
| Acid Black 51 | Cr complex salt (structure) | Distant | 3 |
| Reactive Red 23 | (structure) | Meta/distant | 3 |

TABLE 1-continued

Dyes preferably used in inks of the invention

| C.I. No. | Structural Formula | *1 | *2 |
|---|---|---|---|
| Reactive Violet 2 | (copper-complex azo dye structure with naphthalene bearing NH-triazine (R, Cl substituents), SO₃H, HO₃S groups, azo-linked to phenyl with SO₃H; R = C₆H₅O and NH₂ (mixture)) | Orhto/meta | 3 |
| Reactive Black 1 | (metal-complex azo dye structure with naphthalene bearing NH-triazine (NH₂, Cl substituents), HO₃S, azo-linked to naphthalene with HO₃S, O₂N; Metal = Co + Cr (mixture)) | Orhto/Para | 4 |

*1: Position of anionic groups;
*2: The number of aromatic groups (in terms of benzene ring) bonded to one azo bond.

As a water-soluble organic solvent used in the ink according to the present invention, there may be used any water-soluble organic solvent commonly used in ink-jet recording inks. More specifically, preferred are solvents which are low in their own vapor pressures, can decelerate the evaporation rate of water in the ink and have good dissolving ability to dye or the like, and hence have an effect of preventing clogging.

As examples of the water-soluble organic solvents preferably used in the present invention, may be mentioned amides such as dimethylformamide and dimethylacetamide; ketones and ketone alcohols such as acetone and diacetone alcohol; ethers such as tetrahydrofuran and dioxane; nitrogen-containing heterocyclic ketones such as n-ethyl-2-pyrrolidone, 1,3-dimethyl-2-imidazolidinone and 2-pyrrolidone; polyalkylene glycols such as polyethylene glycol and polypropylene glycol; alkylene glycols the alkylene moiety of which has 2 to 6 carbon atoms, such as ethylene glycol, propylene glycol, butylene glycol, triethylene glycol, 1,2,3-hexane triol, thiodiglycol, hexylene glycol and diethylene glycol; glycerol; lower alkyl ethers of polyhydric alcohols, such as ethylene glycol methyl (or ethyl) ether and triethylene glycol monomethyl (or monoethyl) ether; and the like.

The content of the water-soluble organic solvent to be used in the ink according to the present invention is within a range of from 0 to 50% by weight, preferably from 0 to 20% by weight based on the total weight of the ink.

Examples of the polyamine contained in the ink of the present invention for the purpose of improving the water fastness of the ink include polyethyleneimines having at least 7 nitrogen atoms, and amino acid type polyamines.

As the polyethyleneimines having at least 7 nitrogen atoms, those having a molecular weight ranging from 300 to 100,000 are preferred. On the other hand, the amino acid type polyamines having a carboxyl group may preferably have 1 to 20 nitrogen atoms. Of these, amino acid type polyamines containing a long-chain alkyl group having at least 10 carbon atoms are particularly preferred.

The content of the polyamine to be used in the ink according to the present invention is within a range of from 0.01 to 10% by weight based on the total weight of the ink.

Water as a main solvent is generally used in a range of from 40 to 96% by weight based on the total weight of the ink.

The ink according to the present invention may contain a surfactant. The surfactant may be generally used in a range of from 0.001 to 10% by weight of the total weight of the ink.

In the present invention, other crust preventives than the water-soluble solvents routinely used, such as those which have an evaporation-inhibiting effect, can improve the solubility of a dye, or can prevent viscosity increase, may be contained in the ink for the purpose of improving crusting property of the ink. Examples of the crust preventives used in the present invention include urea, urea derivatives, salts of triethylamine, such as triethylamine hydrochloride, salts of triethanolamine, such as triethanolamine hydrochloride, and toluenesulfonamide derivatives. It is preferable that these crust preventives be suitably chosen and contained in a range of generally from 0.1 to 30% by weight based on the total weight of the ink.

By containing such a crust preventive in the ink, high reliability of the ink can be retained without causing clogging even when the amount of the components (the water-soluble organic solvent and the like) other than water is extremely decreased. In addition, since the water content in the ink increases, the ink on a recording medium becomes liable to evaporate and hence favorably acts on recording properties for plain paper, such as record density, drying and fixing ability, and print quality.

Besides the above components, the ink according to the present invention may contain a solvent capable of improving the drying and fixing ability. The ink using such a solvent becomes far excellent in drying and fixing ability when printed on recording paper. Preferable examples of solvents expected to have such an effect include alkyl alcohols having 1 to 4 carbon atoms, such as methyl alcohol, ethyl alcohol, n-propyl alcohol, isopropyl alcohol, n-butyl alcohol, sec-butyl alcohol, tert-butyl alcohol and isobutyl alcohol; and cycloalkyl alcohols such as cyclohexanol.

The viscosity of the ink according to the present invention is preferably within a range of from 0.7 to 12 cP at 25° C. If the viscosity of the ink is outside the above range, such an ink may not be normally ejected in ink-jet recording. In particular, an ink the viscosity of which exceeds 12 cP becomes slow in penetration into a recording medium. Such an ink is not preferred even from the viewpoint of fixing ability.

It is further preferable that the surface tension of the ink according to the present invention be adjusted to a range of from 20 to 60 dyne/cm at 25° C. If the surface tension is lower than 20 dyne/cm, such an ink becomes weak in force pulling back a meniscus after ejecting a droplet or relatively weak in force pulling back a meniscus upon its projection in ink-jet recording, and so the ink entrains bubbles or wets an orifice, which may form the cause of slippage upon printing in some cases. It is hence not preferable to adjust the ink to such a low surface tension.

By constituting the ink in the above-described manner, the ink according to the present invention can be provided as an ink suitable for use in ink-jet recording on plain paper, excellent, particularly, in water fastness and ink storability and moreover superb in performance characteristics such as record density, drying and fixing ability, print quality and crusting property.

The ink of the present invention having such constitution as described above may suitably be used, particularly, in an ink-jet recording system of a type that recording is conducted by ejecting droplets of an ink by the action of thermal energy. However, it goes without saying that the ink may also be used for general-purpose writing utensils.

As a preferred method and apparatus for conducting recording by using the ink according to the present invention, may be mentioned a method and apparatus in which thermal energy corresponding to recording signals is applied to an ink within a recording head, and ink droplets are generated in accordance with the thermal energy.

Figure 2:
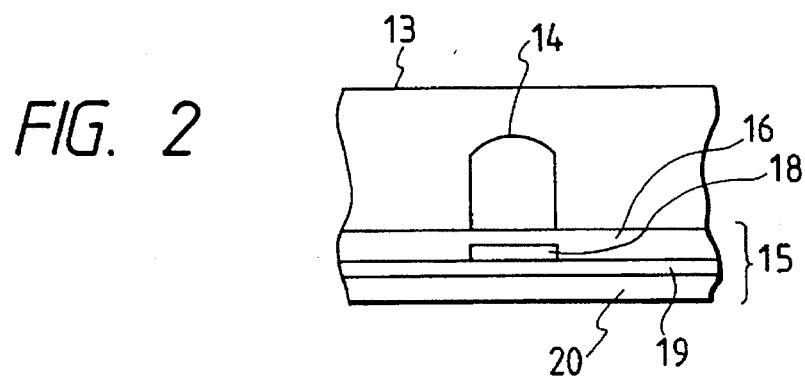
FIG. 2 is a transverse cross-sectional view of the head of the ink-jet recording apparatus.
Figure 3:
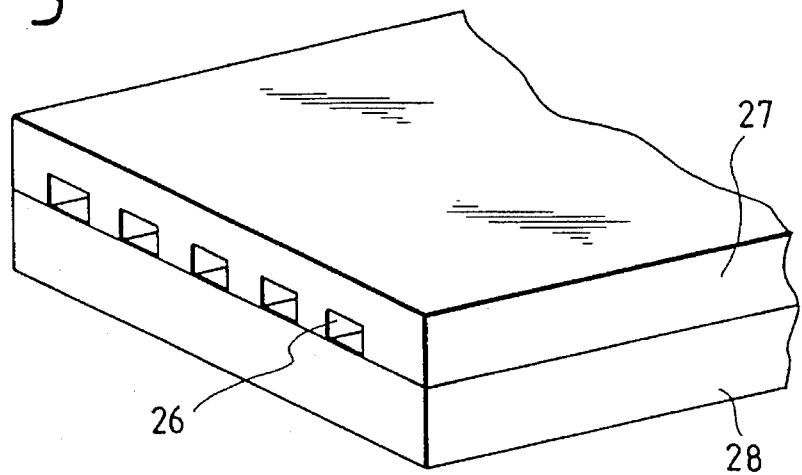
FIG. 3 is a perspective view of the appearance of a multi-head which is an array of such heads as shown in FIGS. 1 and 2.

Examples of the construction of an head, which is a main component of such an apparatus, are illustrated in FIGS. 1, 2 and 3.

A head 13 is formed by bonding a glass, ceramic, plastic plate or the like having a groove 14 through which an ink is passed, to a heating head 15, which is used for thermal recording (the drawing shows a head to which, however, is not limited). The heating head 15 is composed of a protective film 16 formed of silicon oxide or the like, aluminum electrodes 17-1 and 17-2, a heating resistor layer 18 formed of nichrome or the like, a heat accumulating layer 19, and a substrate 20 made of alumina or the like having a good heat radiating property.

An ink 21 comes up to an ejection orifice (minute opening) 22 and forms a meniscus 23 owing to a pressure (not shown).

Now, upon application of electric signals to the electrodes 17-1, 17-2, the heating head 15 rapidly generates heat at the region shown by n to form bubbles in the ink 21 which is in contact with this region. The meniscus 23 of the ink is projected by the action of the pressure thus produced, and the ink 21 is ejected from the orifice 22 to a recording medium 25 in the form of recording droplets 24.

FIG. 3 schematically illustrates a multi-head composed of an array of a number of heads as shown in FIG. 1. The multi-head is formed by closely bonding a glass plate 27 having a number of channels 26 to a heating head 28 similar to the head as illustrated in FIG. 1.

Incidentally, FIG. 1 is a cross-sectional view of the head 13 taken along the flow path of the ink, and FIG. 2 is a cross-sectional view taken along line 2—2 in FIG. 1.

Figure 4:
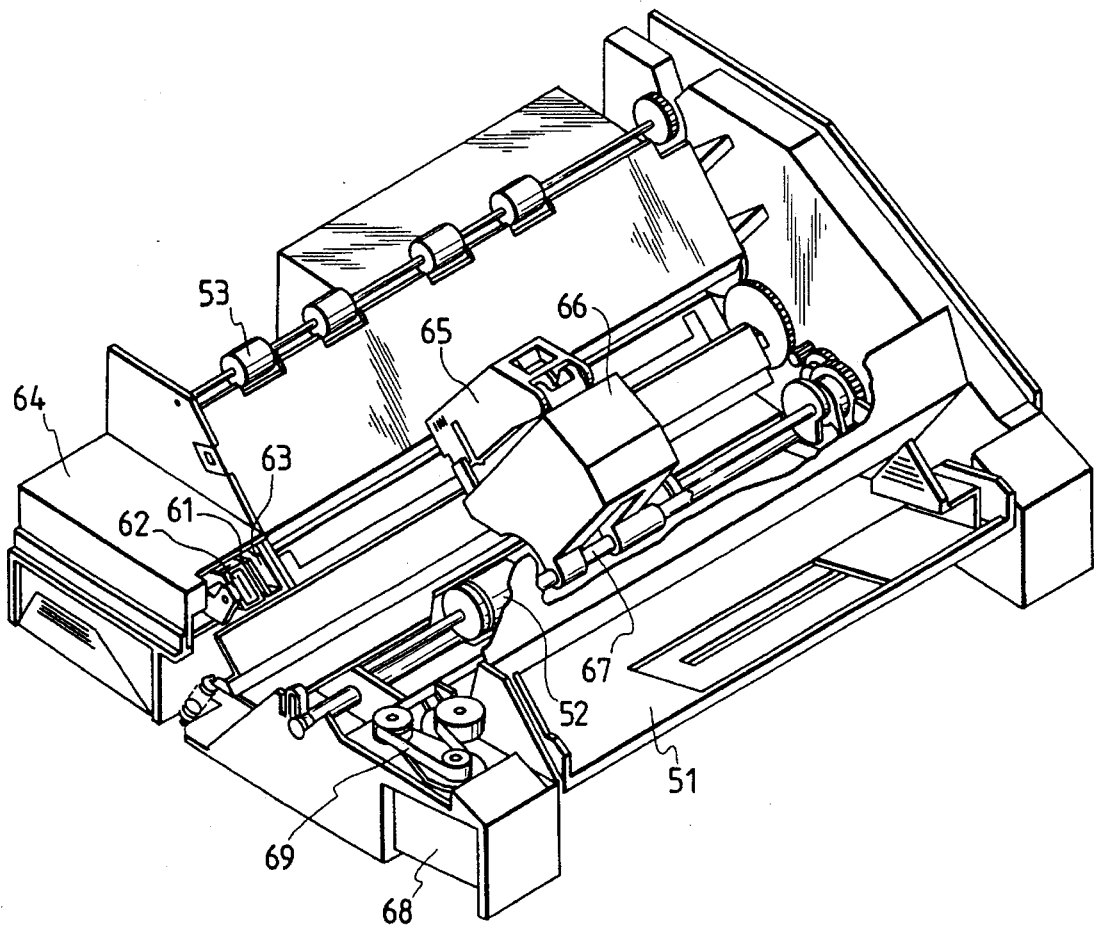
FIG. 4 is a perspective view of an illustrative ink-jet recording apparatus.

FIG. 4 illustrates an exemplary ink-jet recording apparatus in which such a head has been incorporated. In FIG. 4, reference numeral 61 designates a blade serving as a wiping member, one end of which is a stationary end held by a blade-holding member to form a cantilever. The blade 61 is provided at a position adjacent to a region in which a recording head operates.

In this embodiment, the blade 61 is held in such a form that it protrudes to the course through which the recording head is moved. Reference numeral 62 indicates a cap, which is provided at a home position adjacent to the blade 61, and is so constituted that it moves in a direction perpendicular to a direction in which the recording head is moved and comes into contact with the face of ejection openings to cap it. Reference numeral 63 denotes an ink-absorbing member provided adjoiningly to the blade 61 and, similar to the blade 61, held in such a form that it protrudes to the course through which the recording head is moved. The above-described blade 61, cap 62 and absorbing member 63 constitute an ejection-recovery portion 64, where the blade 61 and absorbing member 63 remove water, dust and/or the like from the face of the ink-ejecting openings.

Reference numeral 65 designates the recording head having an ejection-energy-generating means and serving to eject the ink onto a recording medium set in an opposing relation with the ejection opening face provided with ejection openings to conduct recording. Reference numeral 66 indicates a carriage on which the recording head 65 is mounted so that the recording head 65 can be moved. The carriage 66 is slidably interlocked with a guide rod 67 and is connected (not illustrated) at its part to a belt 69 driven by a motor 68. Thus, the carriage 66 can be moved along the guide rod 67 and hence, the recording head 65 can be moved from a recording region to a region adjacent thereto.

Reference numerals 51 and 52 denote a paper feeding part from which the recording media are separately inserted, and paper feed rollers driven by a motor (not illustrated), respectively. With such construction, the recording medium is fed to the position opposite to the ejection opening face of the recording head, and discharged from a paper discharge section provided with paper discharge rollers 53 with the progress of recording.

In the above constitution, the cap 62 in the head recovery portion 64 is receded from the moving course of the recording head 65 when the recording head 65 is returned to its home position, for example, after completion of recording, and the blade 61 remains protruded to the moving course. As a result, the ejection opening face of the recording head 65 is wiped. When the cap 62 comes into contact with the ejection opening face of the recording head 65 to cap it, the cap 62 is moved so as to protrude to the moving course of the recording head.

When the recording head 65 is moved from its home position to the position at which recording is started, the cap 62 and the blade 61 are at the same positions as the positions upon the wiping as described above. As a result, the ejection opening face of the recording head 65 is also wiped at the time of this movement.

The above movement of the recording head to its home position is made not only when the recording is completed or the recording head is recovered for ejection, but also when the recording head is moved between recording regions for the purpose of recording, during which it is moved to the home position adjacent to each recording region at given intervals, where the ejection opening face is wiped in accordance with this movement.

Figure 5:
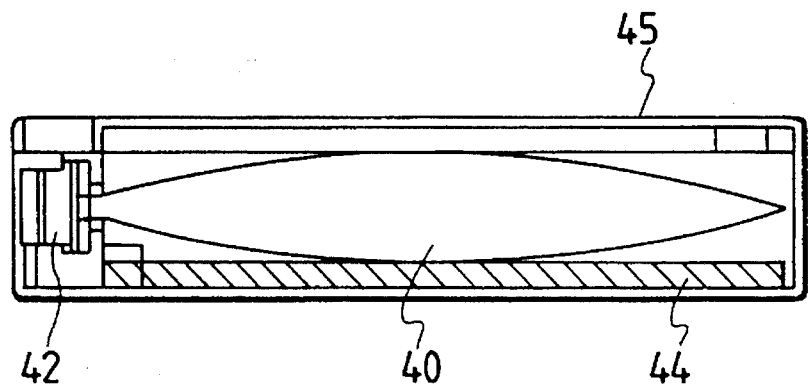
FIG. 5 is a longitudinal cross-sectional view of an ink cartridge.

FIG. 5 illustrates an exemplary ink cartridge in which an ink to be fed to the head through an ink-feeding member, for example, a tube is contained. Here, reference numeral 40 designates an ink container portion containing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the head. Reference numeral 44 indicates an ink absorbing member for receiving a waste ink. It is preferable that the ink container portion is formed of a polyolefin, in particular, polyethylene, at its surface with which the ink comes into contact.

The ink-jet recording apparatus used in the present invention may not be limited to the apparatus as described above in which the head and the ink cartridge are separately provided. Therefore, a device in which these members are integrally formed as shown in FIG. 6 can also be preferably used.

Figure 6:
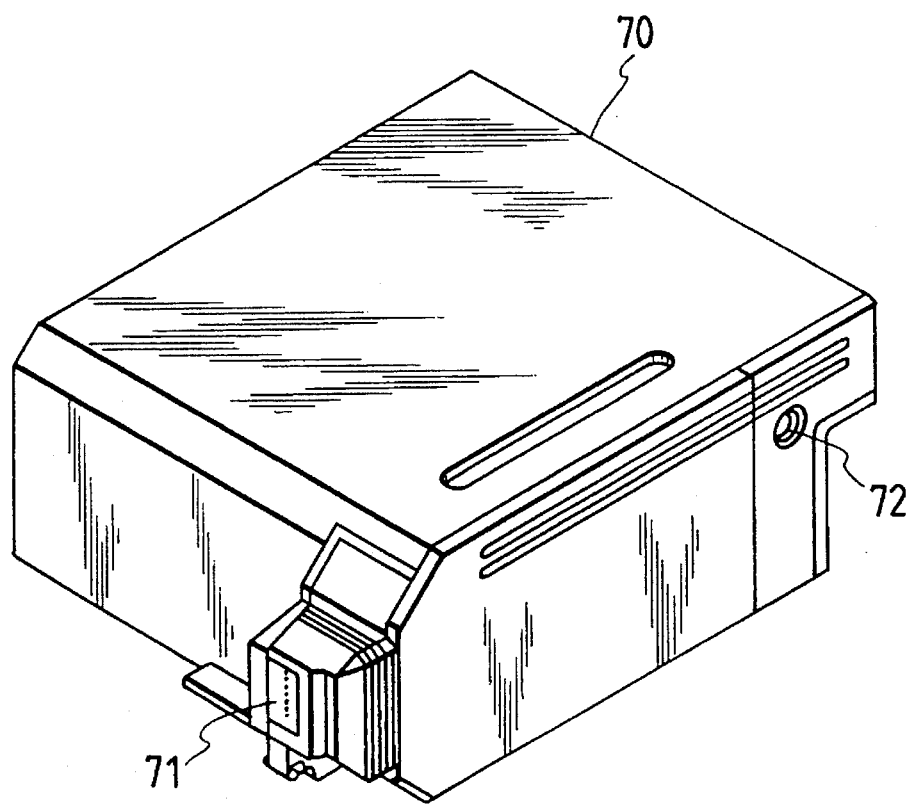
FIG. 6 is a perspective view of a recording unit.

In FIG. 6, reference numeral 70 designates a recording unit, in the interior of which an ink container portion containing an ink, for example, an ink-absorbing member, is contained. The recording unit 70 is so constructed that the ink in such an ink-absorbing member is ejected in the form of ink droplets through a head 71 having a plurality of orifices. In this invention, it is preferable to use polyurethane as a material for the ink-absorbing member.

Reference numeral 72 indicates an air passage for communicating the interior of the recording unit 70 with the atmosphere. This recording unit 70 can be used in place of the recording head shown in FIG. 4, and is detachably installed on the carriage 66.

The present invention will hereinafter be described more specifically by the following Examples and Comparative Examples. However, the present invention is not limited to these examples only. Incidentally, all designations of "part" or "parts" and "%" as will be used in the following examples mean part or parts by weight and % by weight unless expressly noted.

Examples 1 to 10 and Comparative Examples 1 to 11:

Their corresponding components shown in Tables 2 to 5 were mixed in beakers and stirred at 25° C. for 4 hours. The resulting mixtures were separately filtered under pressure through a membrane filter having a pore size of 0.22 μm, thereby preparing respective inks according to Examples 1 to 10 and Comparative Examples 1 to 11.

Using each of the thus-obtained inks, printing was performed on plain paper (PPC paper SK, product of Canon Inc.) by means of a Canon Ink-jet Printer BJC-820J (resolution: 360 DPI; ejection ink quantity: 45 pl) in which an ink is ejected by the action of thermal energy, thereby evaluating the ink in water fastness and ink storability. The results of the evaluation are also shown in Tables 2 to 5.

As shown in Tables 2 and 3, the printing with each of the inks according to Examples 1 to 10 obtained excellent results in record density, drying and fixing ability, print quality and crusting property. The storability of these inks was also good without any problem. The water fastness was very good without running of any dye.

On the contrary, as shown in Tables 4 and 5, the inks according to Comparative Examples, which separately used dyes different in structure from those used in the present invention, underwent decomposition of dye and had a problem of ink storability as demonstrated by the fact that a peak of an absorption spectrum was reduced by at least 20%, or the inks containing no polyamine were absolutely poor in water fastness.

[Evaluation methods]

(1) Water fastness:

A solid print image of 10×20 mm was printed on the SK paper by the printer to measure an initial optical density of the resulting print sample. The print sample was then immersed in purified water and left to stand for 5 minutes. Thereafter, the print sample was gently taken out of the water, and water was removed with dry paper such as a paper towel from the surface of the print sample. The print samples was then dried in a room. The optical density of the solid printed area of the dried print sample was measured again. The value obtained by this measurement was divided by the initial optical density, and then multiplied by 100, thereby obtaining the percent retention (%) of the optical density OD. This value was used as an index for evaluating the water fastness. It is said that the water fastness of the ink is better as this value is closer to 100.

(2) Ink storability:

Each of the inks obtained in Examples and Comparative Examples was placed in a heat-resistant threaded neck bottle (Duran 50 Glass, product of Duran AG in Germany) and stored in a temperature controlled chamber at 60° C. After 3 months, the ink was taken out of the chamber to visually compare this stored ink with the initial ink before the storage as to whether solid foreign matter was present in the ink or not.

Besides, the absorption spectra in a visible region of the initial ink and the stored ink, which had been diluted to 1/1000, were measured by means of a visible absorptiometer U-3200 (manufactured by Hitachi Ltd.). In each test, the initial ink and the stored ink were compared with each other to determine whether they were different from each other or not, thereby evaluating the ink in the water fastness in accordance with the following standard. When they made little difference, such an ink was ranked as an excellent ink.

A: The stored ink contained no foreign matter, and a difference in the maximum peak of absorption spectrum was smaller than 20%;

B: The stored ink contained foreign matter, or a difference in the maximum peak of absorption spectrum was not smaller than 20%.

TABLE 2

Ink compositions and evaluation results of Examples 1 to 5

| | Example | | | | |
|---|---|---|---|---|---|
| | 1 | 2 | 3 | 4 | 5 |
| Acid Yellow 11 | 3 | | | | |
| Acid Yellow 23 | | 2 | | | |
| Acid Yellow 25 | | | 3 | | |
| Acid Red 186 | | | | 3 | |
| Direct Blue 98 | | | | | 2 |
| Glycerol | 5 | 5 | 5 | 5 | 5 |
| Thiodiglycol | 5 | 5 | 5 | 5 | 5 |
| Isopropyl alcohol | 4 | | | | |
| Surfactant (Acetylenol EH, product of Kawaken Fine Chemicals Co., Ltd.) | | 1 | 1 | 1 | 1 |
| PA1 | | | | | |
| PA2 | 3 | | 2 | 2 | 2 |
| PA3 | | 2 | | | |
| Water | Bal | Bal | Bal | Bal | Bal |
| Water fastness (percent retention of OD) | 90 | 85 | 100 | 100 | 100 |
| Ink storability | A | A | A | A | A |

PA1: Polyethyleneimine (molecular weight: 45,000);
PA2: $C_{12}H_{25}-NH-C_2H_4-NH-C_2H_4-NH-CH_2-COOH$;
PA3: Polyethyleneimine (molecular weight: 10,000).

TABLE 3

Ink compositions and evaluation results of Examples 6 to 10

| | Example | | | | |
|---|---|---|---|---|---|
| | 6 | 7 | 8 | 9 | 10 |
| Direct Yellow 39 | 2 | | | | |
| Acid Orange 74 | | 3 | | | |
| Acid Blue 158 | | | 2 | | |
| Reactive Red 23 | | | | 3 | |
| Reactive Black 1 | | | | | 3 |
| Glycerol | 5 | 5 | 5 | 7 | 5 |
| Thiodiglycol | 5 | 5 | 5 | 7 | 5 |
| Isopropyl alcohol | 4 | 4 | | | |
| Surfactant (Acetylenol EH, product of Kawaken Fine Chemicals Co., Ltd.) | | | 1 | 1 | 1 |
| PA1 | 0.5 | | | | |
| PA2 | | 1 | | 2 | 1 |
| PA3 | | | 1 | | |
| Water | Bal | Bal | Bal | Bal | Bal |
| Water fastness (percent retention of OD) | 95 | 85 | 100 | 95 | 85 |
| Ink storability | A | A | A | A | A |

PA1: Polyethyleneimine (molecular weight: 45,000);
PA2: $C_{12}H_{25}-NH-C_2H_4-NH-C_2H_4-NH-CH_2-COOH$;
PA3: Polyethyleneimine (molecular weight: 10,000).

TABLE 4

Ink compositions and evaluation results of Comparative Examples 1 to 6

| | Comparative Example | | | | | |
|---|---|---|---|---|---|---|
| | 1 | 2 | 3 | 4 | 5 | 6 |
| Direct Yellow 11 | 3 | | | | | |
| Direct Yellow 23 | | 2 | | | | |
| Reactive Yellow 2 | | | 3 | | | |
| Acid Red 1 | | | | 3 | | |
| Acid Red 27 | | | | | 3 | |
| Acid Blue 113 | | | | | | 2 |
| Glycerol | 5 | 5 | 5 | 5 | 5 | 5 |
| Thiodiglycol | 5 | 5 | 5 | 5 | 5 | 5 |
| Isopropyl alcohol | 4 | | | | | |

TABLE 4-continued

Ink compositions and evaluation results of Comparative Examples 1 to 6

| | Comparative Example | | | | | |
|---|---|---|---|---|---|---|
| | 1 | 2 | 3 | 4 | 5 | 6 |
| Surfactant (Acetylenol EH, product of Kawaken Fine Chemicals Co., Ltd.) | | 1 | 1 | 1 | 1 | 1 |
| PA1 | | | | 2 | 1 | |
| PA3 | | | 2 | | | 2 |
| Water | Bal | Bal | Bal | Bal | Bal | Bal |
| Water fastness (percent retention of OD) | 30 | 15 | 90 | 90 | 95 | 95 |
| Ink storability | A | A | B | B | B | B |

PA1: Polyethyleneimine (molecular weight: 45,000);
PA3: Polyethyleneimine (molecular weight: 10,000).

TABLE 5

Ink compositions and evaluation results of Comparative Examples 7 to 11

| | Comparative Example | | | | |
|---|---|---|---|---|---|
| | 7 | 8 | 9 | 10 | 11 |
| Direct Red 4 | 2 | | | | |
| Direct Blue 165 | | 3 | | | |
| Acid Red 35 | | | 3 | | |
| Acid Blue 9 | | | | 3 | |
| Reactive Red 17 | | | | | 3 |
| Glycerol | 5 | 5 | 5 | 7 | 5 |
| Thiodiglycol | 5 | 5 | 5 | 7 | 5 |
| Isopropyl alcohol | 4 | 4 | | | |
| Surfactant (Acetylenol EH, product of Kawaken Fine Chemicals Co., Ltd.) | | | 1 | 1 | 1 |
| PA1 | 0.5 | | | | |
| PA2 | | | 0.5 | | |
| PA3 | | 1 | | | 1.5 |
| Water | Bal | Bal | Bal | Bal | Bal |
| Water fastness (percent retention of OD) | 95 | 85 | 90 | 15 | 95 |
| Ink storability | B | B | B | A | B |

PA1: Polyethyleneimine (molecular weight: 45,000);
PA2: $C_{12}H_{25}-NH-C_2H_4-NH-C_2H_4-NH-CH_2-COOH$;
PA3: Polyethyleneimine (molecular weight: 10,000).

storability as to the inks for ink-jet recording can be achieved, which compatibility has not been achieved to date. In addition, excellent prints can be provided without deteriorating other ink-jet recording properties.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded to the broadest interpretation so as to encompass all such modifications and equivalent structures and functions.

What is claimed is:

1. An ink comprising a dye having at least one anionic group, a polyamine selected from the group consisting of a polyamine containing an amino acid group and a polyethyleneimine containing at least 7 nitrogen atoms in its molecule, and water, wherein the dye is either a metallized azo dye or a nonmetallized azo dye satisfying the following conditions (x) and (y) at the same time:

(x) no anionic group is situated at an ortho position to the azo bond, and at least one anionic group exists at another position than the ortho position to the azo bond; and (y) at least one aromatic residue is bonded to the azo bond, and the aromatic ring of the aromatic residue is a benzene or naphthalene ring, with the proviso that the aromatic rings situated on both sides of the azo bond are not naphthalene rings at the same time if present.

2. The ink according to claim 1, wherein the molecular weight of the polyethyleneimine falls within a range of from 300 to 100,000.

3. The ink according to claim 1, wherein the polyamine containing an amino acid group has 1 to 20 nitrogen atoms.

4. The ink according to claim 1, wherein the polyamine or the polyethyleneimine is contained in a range of from 0.01 to 10% by weight based on the total weight of the ink.

5. The ink according to claim 1, wherein the water is contained in a range of from 40 to 96% by weight based on the total weight of the ink.

6. The ink according to claim 1, wherein the dye is contained in a range of from 0.1 to 10% by weight based on the total weight of the ink.

7. The ink according to claim 1, wherein the anionic group is selected from the group consisting of a sulfonic group, a carboxylic group, a phosphoric group and substituted groups thereof.

8. The ink according to claim 1, wherein the nonmetallized dye is selected from the group consisting of Direct Yellow 1, Direct Yellow 8, Direct Yellow 9, Direct Yellow 10, Direct Yellow 28, Direct Yellow 44, Direct Yellow 50, Acid Yellow 11, Acid Yellow 17, Acid Yellow 23, Acid Yellow 25, Acid Yellow 36, Acid Yellow 38, Acid Yellow 42, Acid Yellow 44, Acid Yellow 72, Acid Yellow 99, Acid Red 183, Acid Red 186 and Acid Red 296.

9. An ink-jet recording method comprising applying an ink to a recording medium by an ink-jet system to conduct recording, wherein the ink according to any one of claim 1 to 8 is used as said ink.

10. The ink-jet recording method according to claim 9, wherein the ink-jet system is a system in which thermal energy is applied to the ink to generate ink droplets.

11. A recording unit comprising an ink container portion and a head from which the ink is ejected in the form of ink droplets, wherein the ink according to any one of claim 1 to 8 is used as said ink.

12. The recording unit according to claim 11, wherein an ink-jet system, in which thermal energy is applied to the ink to generate ink droplets, is applied to the head.

13. An ink cartridge comprising an ink container portion, wherein the ink according to any one of claim 1 to 8 is used as said ink.

14. An ink-jet recording apparatus comprising the recording unit according to claim 11.

15. An ink-jet recording apparatus comprising the ink cartridge according to claim 13.

16. An ink-jet recording apparatus comprising the recording unit of claim 12.

* * * * *

UNITED STATES PATENT AND TRADEMARK OFFICE
CERTIFICATE OF CORRECTION

PATENT NO. : 5,482,545
DATED : January 9, 1996
INVENTOR(S) : MAKOTO AOKI, et al.

It is certified that error appears in the above-indentified patent and that said Letters Patent is hereby corrected as shown below:

COLUMN 1

Line 65, "atoms. The" should read --atoms, the--.

COLUMN 12

Direct Blue 98, " 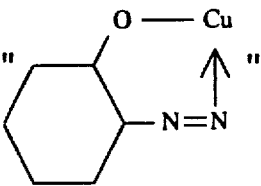 "

should read -- 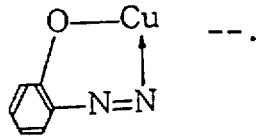 --.

COLUMN 13

Direct Violet 48, "Orhto" should read --Ortho--.
Direct Brown 112, "Dirct" should read --Direct--; and "Orhto" should read --Ortho--.

COLUMN 17

Reactive Violet 2, "Orhto/meta" should read --Ortho/meta--.
Reactive Black 1, "Orhto/Para" should read --Ortho/Para--.

UNITED STATES PATENT AND TRADEMARK OFFICE
CERTIFICATE OF CORRECTION

PATENT NO. : 5,482,545     Page 2 of 3

DATED : January 9, 1996

INVENTOR(S) : MAKOTO AOKI, et al.

It is certified that error appears in the above-indentified patent and that said Letters Patent is hereby corrected as shown below:

COLUMN 20

Line 53, "an" should read --a--.

COLUMN 23

Line 33, "samples" should read --sample--.

COLUMN 25

Line 45 should read -- In the Tables 2 to 5, the term "Bal" at the line of Water means a balance of water up to 100 parts of inks.
    According to the present invention, as described above, compatibility of water fastness with ink storability as to the inks for ink-jet recording can be achieved, which compatibility has not been achieved to date. In addition, excellent prints can be provided without deteriorating other ink-jet recording properties.--.

Lines 45-47 should be deleted.

UNITED STATES PATENT AND TRADEMARK OFFICE
CERTIFICATE OF CORRECTION

PATENT NO. : 5,482,545         Page 3 of 3

DATED : January 9, 1996

INVENTOR(S) : MAKOTO AOKI, et al.

It is certified that error appears in the above-indentified patent and that said Letters Patent is hereby corrected as shown below:

<u>COLUMN 26</u>

Line 40, "claim" should read --claims--.
    Line 47, "claim" should read --claims--.
    Line 53, "claim" should read --claims--.

Signed and Sealed this

Eleventh Day of June, 1996

Attest:

BRUCE LEHMAN

Attesting Officer      Commissioner of Patents and Trademarks